Sept. 15, 1959     H. L. ALWOOD     2,904,147
CLUTCH
Filed Aug. 30, 1957     2 Sheets-Sheet 1
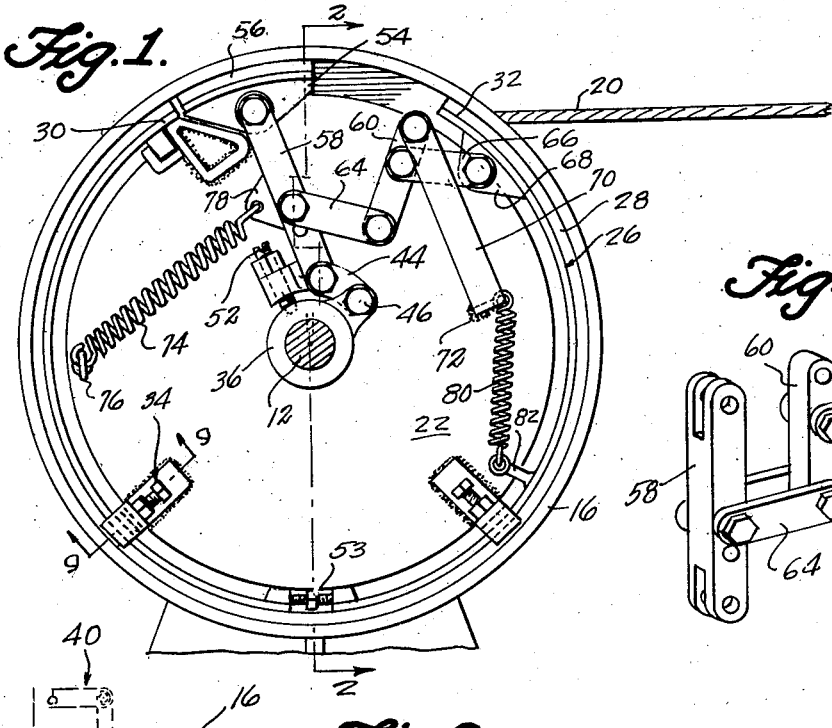
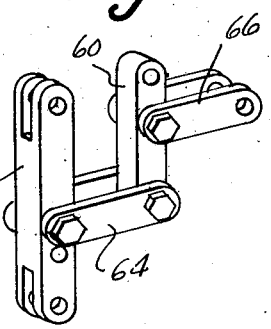
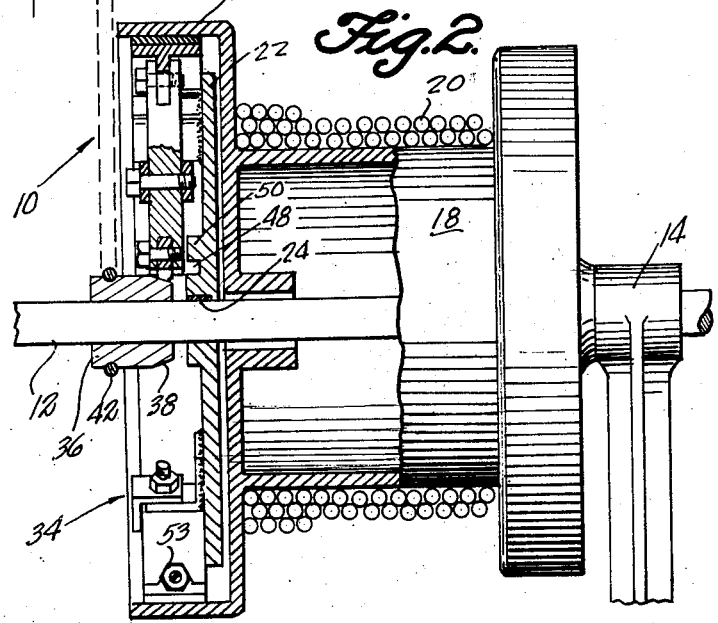
INVENTOR.
Harold L. Alwood,
BY
McMorrow, Berman + Davidson
ATTORNEYS Sept. 15, 1959　　　H. L. ALWOOD　　　2,904,147
CLUTCH
Filed Aug. 30, 1957　　　　　　　　　2 Sheets-Sheet 2
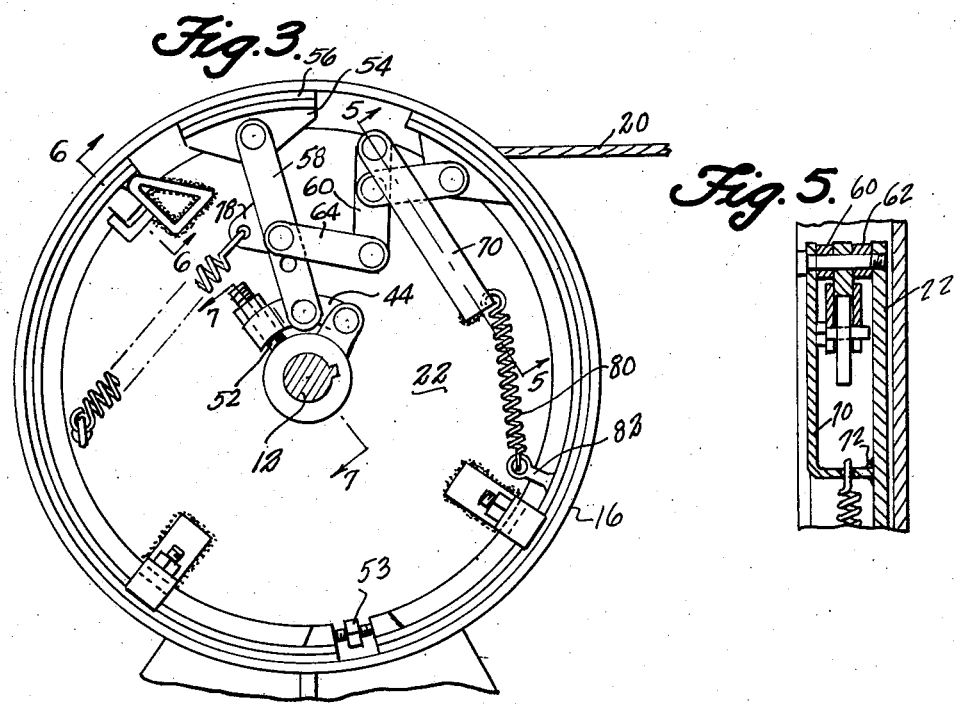
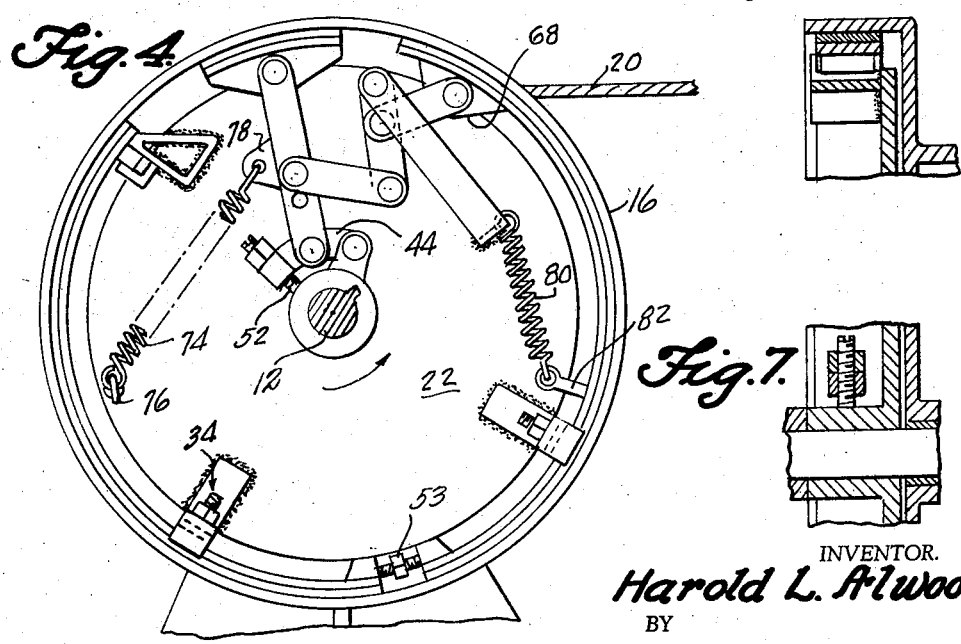
INVENTOR.
Harold L. Alwood,
BY
McMorrow, Berman & Davidson
ATTORNEYS

United States Patent Office 2,904,147
Patented Sept. 15, 1959

2,904,147

CLUTCH

Harold L. Alwood, Detroit, Mich.

Application August 30, 1957, Serial No. 681,344

4 Claims. (Cl. 192—35)

The present invention relates to a clutch of the type used in hoists, excavators, and the like.

An object of the present invention is to provide a clutch for a hoist, or other machine, which lends itself to smooth operation and one which requires a minimum of force to actuate.

Another object of the present invention is to provide a clutch which is constructed of few parts and which is readily assembled and disassembled.

A further object of the present invention is to provide a clutch which is sturdy in construction, one economical to manufacture and assemble, and one which is highly effective in action.

These and other objects and advantages of the present invention will be fully apparent from the following description when taken in connection with the annexed drawings, in which:

Figure 1 is an elevational view of the clutch of the present invention with the shaft thereof shown in section, Figure 2 is a sectional view taken on the line 2—2 of Figure 1, Figure 3 is an elevational view similar to Figure 1 showing the booster clutch shoe in a first position of movement, Figure 4 is an elevational view showing the booster clutch shoe in a final position of movement, Figure 5 is a sectional view on an enlarged scale taken on the line 5—5 of Figure 3, Figure 6 is a sectional view on an enlarged scale taken on the line 6—6 of Figure 3, Figure 7 is a sectional view on an enlarged scale taken on the line 7—7 of Figure 3, Figure 8 is a fragmentary isometric view of the linkage means used between the actuating arm and the main clutch shoe, and Figure 9 is a sectional view on an enlarged scale taken on the line 9—9 of Figure 1.

Referring in greater detail to the drawings in which like numerals indicate like parts throughout the several views, the clutch of the present invention is designated generally by the numeral 10 and is used in combination with a rotatable drive shaft 12 supported for rotation in suitable support means, such as the trunnion 14 shown in Figure 2.

A clutch drum 16 is mounted on the shaft 12 for rotation about the shaft 12 as an axis. The clutch drum 16 is formed integrally with a winch drum 18 having wound thereon a portion of a hoisting cable 20.

A disc member 22 is positioned within the clutch drum 16 and is fixedly secured to the shaft 12. A key 24 secures the disc member 22 to the shaft 12. A main clutch shoe 26 is positioned adjacent to and extends about the major portion of the inner surface of the drum 16 and is normally out of contacting engagement with the drum 16. The main clutch shoe 26 carries a strip of friction material, as at 28 in Figure 1, for engagement with the inner surface of the drum 16, such material and its attachment to the shoe 26 being of conventional construction.

The ends 30 and 32 of the main clutch shoe 26 are spaced from each other with the one end 30 secured to the disc member 22 and the other end 32 connected to the disc member 22 for movement toward and away from the clutch drum 16. The intermediate portions of the main clutch shoe 26 are held in position by means of a bracket and adjusting bolt assembly 34, as shown in detail in Figure 9.

A clutch element or sleeve 36, having a conical nose portion 38, is mounted on the shaft 12 for sliding movement toward and away from the disc member 22. Such clutch element, (Figure 2), is of conventional construction and is movable into the drum 16 and out of the drum 16 by means of a conventional linkage shown in dotted lines and indicated by the reference numeral 40. Such linkage 40 includes a yoke 42 slidably mounted upon the sleeve 36 and also of conventional construction.

An actuating arm 44 is positioned within the clutch drum 16 adjacent to and transversely of the shaft 12 and has one end, as at 46, mounted upon a post for connection to a disc member 22 for swinging movement toward and away from the shaft 12. The post, indicated by the numeral 48 in Figure 2, has one end threadably engaged in a boss 50 which is formed integrally with and carried by the disc member 22. The other end of the arm 44 carries a pin 52 engageable with the nose portion 38 of the sleeve 36.

A booster clutch shoe 54 carrying a band 56 is positioned in the space between the ends 30 and 32 of the main clutch shoe 36, and is normally out of contacting engagement with the adjacent portion of the inner surface of the clutch drum 16. As shown in Figure 1, the booster clutch shoe 54 is normally adjacent the one end 30 of the main clutch shoe 26.

Means is provided connecting the booster clutch shoe 54 to the arm 44 intermediate the ends of the latter, so that the booster clutch shoe 54 is moved into contacting engagement with a portion of the inner surface of the clutch drum 16 between the main clutch shoe ends 30 and 32, responsive to sliding movement of the sleeve 36 on the shaft 12 in the direction toward the disc member 22, simultaneously with the swinging movement of the arm 44 away from the shaft 12. Specifically, this means includes a lever 58 having one end pivotally connected to the arm 44 intermediate the ends of the latter, and having the other end pivotally connected to the booster clutch shoe 54.

An important feature of the present invention is that the lever 58 extends in a position which is not radial with respect to the shaft 12. Normally, the booster clutch shoe 54 and attached band 56 are out of contact with the drum 16 and are adjacent the end 30 of the main clutch shoe 26. Upon swinging movement of the arm 44 away from the shaft 12, the shoe 54 is brought into engagement with the inner surface of the drum 16 and is swung, in a clockwise direction, from the position adjacent the shoe end 30 to a position adjacent to the shoe end 32. This necessitates an over-center action and effects the tightening of the shoe 54 against the inner surface of the drum 16. It will be seen, therefore, that only a slight swinging movement of the arm 44 is required to bring the booster clutch shoe 54 into frictional engagement with the inner surface of the drum 16.

Means is provided connecting the other end 32 of the main clutch shoe 26 to the lever 58, so that upon execution of the movement of the booster clutch shoe 54 into contacting engagement with the adjacent portion of the inner surface of the drum 16 between the spaced ends 30 and 32 of the main clutch shoe 26, the booster clutch shoe 54 will be moved between the spaced shoe ends 30 and 32, from the position adjacent the end 30 to a position adjacent to and spaced from the shoe end 32, responsive to limited movement of the clutch drum 16 relative to the disc member 22 and to simultaneously move the main clutch shoe 26 into contacting engagement with the adjacent portion of the inner surface of the clutch drum 16. Specifically, this means includes another or second arm 60 having one end pivotally connected, by means of a bolt 62, to the disc member 22, the bolt 62 being threaded into a hole provided in the disc member 22, as shown in Figure 5. The other end of the arm 60 is pivotally connected to a two-piece link member 64 at one end of the latter. The other end of the link member 64 is connected to the lever 58 intermediate the ends of lever 58. A two-piece link means 66 has one end connected to the intermediate portion of the arm 60 for pivotal movement thereabout and has its other end pivotally connected to a boss 68 which projects from the under side of the main clutch shoe 26 inwardly of and adjacent the end 32 of the latter. An L-shaped bracket 70 has the end of its short leg welded, as at 72 in Figure 1, to the disc member 22 and the free end of the long leg is provided with a hole receiving the portion of the bolt 62 adjacent its head.

Spring means is provided operatively connected to the booster clutch shoe 54 and to the disc member 22 urging the booster clutch shoe to the position toward the shaft 12 out of contacting engagement with the drum 16 and adjacent the main clutch band end 30. This spring means consists in a coil spring under tension, indicated by the numeral 74, and having one end fixed to an upstanding eye formation 76 carried by the disc member 22, and the other end secured in a projection 78 carried by the lever 58 at a point adjacent to the connection of the link member 64 and between that point of connection and the shoe 54.

Other spring means is provided operatively connected to the end 32 of the main clutch shoe 26 and to the disc member 22, urging the main clutch shoe 26 to the position out of engagement with the drum 16. Specifically, this means consists in another coil spring 80 having one end secured to the short leg of the bracket 70 adjacent the weld 72, and the other end connected to a post 82 which projects from the inner face of the shoe 26 at a point spaced from the shoe end 32.

Means other than the sleeve 36 may be used to shift the clutch actuating arm 44 to effect the movement of the booster clutch shoe 54 into engagement with the inner surface of the drum 16, if desired.

In operation, actuation of the linkage 40, manually or otherwise, will effect the movement of the sleeve 36 toward the disc member 22, so that the nose portion 38 thereof bears against and raises the pin 52 and effects the clockwise rotation of the arm 44 and results in movement of the lever 58, so that the booster clutch shoe 54 is moved into engagement with the portion of the drum 16 adjacent the main clutch shoe end 30. It is assumed that the shaft 12 and the disc member 22 are rotating in the direction indicated by the arrow in Figure 4. Upon engagement of the booster clutch shoe 54 with the drum 16, the drum 16, up to this time being motionless, tends to hold back the movement of the booster clutch shoe 54, so that it moves from its position adjacent the main clutch shoe end 30 toward the other main shoe end 32. Due to the offset position of the lever 58 the movement toward the main clutch shoe end 32 of the booster clutch shoe 54 wedges the latter into close and frictional engagement with the drum 16 and also through the linkage including the arm 60, link member 64, and link means 66, forces the main clutch shoe 26 into frictional engagement with the inner surface of the drum 16, so that the drum 16 and the shaft 12 rotate at the same speed and with a positive connection therebetween. Upon release of the linkage 40 or reverse movement thereof, the spring 74 returns the booster clutch shoe 54 to its position adjacent the main clutch shoe end 30, and the spring 80 pulls the main clutch shoe 26 out of engagement with the drum 16.

The main clutch shoe 26 is formed in two sections with the meeting end portions connected together by an adjusting bolt assembly 53 of conventional construction.

An important feature of the present invention is that the offset relation of the lever 58 effectively prevents chatter of the clutch when the booster clutch shoe 54 engages the drum 16 and provides for smooth operation of the clutch. Further, the clutch of the present invention cannot become disengaged until the linkage 40 is manually shifted to move the sleeve 36 outwardly on the shaft 12 to a point where the adjustable booster clutch shoe pin 52 is no longer engaged by the conical nose portion 38 of the sleeve 36.

While only a single embodiment of the present invention has been shown and described, other embodiments are contemplated and numerous changes and modifications may be made therein without departing from the spirit of the invention as set forth in the appended claims.

What is claimed is:

1. The combination with a drive shaft, of a clutch comprising a clutch drum mounted on said shaft for rotation about said shaft as an axis, a disc member positioned within said drum and carried by said shaft, a main clutch shoe positioned adjacent to and extending about the major portion of the inner surface of said drum and normally out of contacting engagement with said drum inner surface, the ends of said main clutch shoe being spaced from each other, one end of said main clutch shoe being secured to said disc member, a clutch element mounted on said shaft for sliding movement toward and away from said disc member, an arm positioned within said drum adjacent to and transversely of said shaft and having one end connected to said disc member for swinging movement toward and away from said shaft, a pin carried by the other end of said arm and engageable with said clutch element, a booster clutch shoe positioned within the space between the ends of said main clutch shoe normally out of contacting engagement with the adjacent portion of the inner surface of said drum, means connecting said booster clutch shoe to said arm so that said booster clutch shoe is movable into contacting engagement with the portion of the inner surface of said drum between the ends of said main clutch shoe responsive to the sliding movement of said clutch element toward said disc member and simultaneous swinging movement of said arm away from said shaft, and means connecting the other end of said main clutch shoe to said means so that upon said booster clutch shoe having executed the movement into contacting engagement with the adjacent surface of said drum between the spaced ends of said main clutch shoe said booster clutch shoe will be moved between said spaced ends of said main clutch shoe responsive to limited movement of said drum relative to said disc member and simultaneously move said main clutch shoe into contacting engagement with the adjacent portion of the inner surface of said drum.

2. The combination with a drive shaft, of a clutch comprising a clutch drum mounted on said shaft for rotation about said shaft as an axis, a disc member positioned within said drum and carried by said shaft, a main clutch shoe positioned adjacent to and extending about the major portion of the inner surface of said drum and normally out of contacting engagement with said drum inner surface, the ends of said main clutch shoe being spaced from each other, one end of said main clutch shoe being secured to said disc member, a clutch element mounted on said shaft for sliding movement toward and away from said disc member, an arm positioned within said drum adjacent to and transversely of said shaft and having one end connected to said disc member for swinging movement toward and away from said shaft, a pin carried by the other end of said arm and engageable with said clutch element, a booster clutch shoe positioned within the space between the ends of said main clutch shoe and normally out of contacting engagement with the adjacent portion of the inner surface of said drum, means connecting said booster clutch shoe to said arm so that said booster clutch shoe is movable into contacting engagement with the portion of the inner surface of said drum between the ends of said main clutch shoe responsive to the sliding movement of said clutch element toward said disc member and simultaneous swinging movement of said arm away from said shaft, means connecting the other end of said main clutch shoe to said means so that upon said booster clutch shoe having executed the movement into contacting engagement with the adjacent surface of said drum between the spaced ends of said main clutch shoe said booster clutch shoe will be moved between said spaced ends of said main clutch shoe responsive to limited movement of said drum relative to said disc member and simultaneously move said main clutch shoe into contacting engagement with the adjacent portion of the inner surface of said drum, spring means operatively connected to said booster clutch shoe and to said disc member urging said booster clutch shoe to the position of out contact with said drum, and other spring means operatively connected to said other end of said main clutch shoe and to said disc member urging said main clutch shoe out of engagement with said drum.

3. The combination with a drive shaft, of a clutch comprising a clutch drum mounted on said shaft for rotation about said shaft as an axis, a disc member positioned within said drum and carried by said shaft, a main clutch shoe positioned adjacent to and extending about the major portion of the inner surface of said drum and normally out of contacting engagement with said drum inner surface, the ends of said main clutch shoe being spaced from each other, one end of said main clutch shoe being secured to said disc member, a clutch element mounted on said shaft for sliding movement toward and away from said disc member, an arm positioned within said drum adjacent to and transversely of said shaft and having one end connected to said disc member for swinging movement toward and away from said shaft, a pin carried by the other end of said arm and engageable with said clutch element, a booster clutch shoe positioned within the space between the ends of said main clutch shoe and normally out of contacting engagement with the adjacent portion of the inner surface of said drum, means connecting said booster clutch shoe to said arm so that said booster clutch shoe is movable into contacting engagement with the portion of the inner surface of said drum between the ends of said main clutch shoe responsive to the sliding movement of said clutch element toward said disc member and simultaneous swinging movement of said arm away from said shaft, and means connecting the other end of said main clutch shoe to said means so that upon said booster clutch shoe having executed the movement into contacting engagement with the adjacent surface of said drum between the spaced ends of said main clutch shoe said booster clutch shoe will be moved between said spaced ends of said main clutch shoe responsive to limited movement of said drum relative to said disc member and simultaneously move said main clutch shoe into contacting engagement with the adjacent portion of the inner surface of said drum, said first named means comprising a lever having one end pivotally connected to said arm intermediate the ends of the latter and having the other end pivotally connected to said booster clutch shoe.

4. The combination with a drive shaft, of a clutch comprising a clutch drum mounted on said shaft for rotation about said shaft as an axis, a disc member positioned within said drum and carried by said shaft, a main clutch shoe positioned adjacent to and extending about the major portion of the inner surface of said drum and normally out of contacting engagement with said drum inner surface, the ends of said main clutch shoe being spaced from each other, one end of said main clutch shoe being secured to said disc member, a clutch element mounted on said shaft for sliding movement toward and away from said disc member, an arm positioned within said drum adjacent to and transversely of said shaft and having one end connected to said disc member for swinging movement toward and away from said shaft, a pin carried by the other end of said arm and engageable with said clutch element, a booster clutch shoe positioned within the space between the ends of said main clutch shoe and normally out of contacting engagement with the adjacent portion of the inner surface of said drum, means connecting said booster clutch shoe to said arm so that said booster clutch shoe is movable into contacting engagement with the portion of the inner surface of said drum between the ends of said main clutch shoe responsive to the sliding movement of said clutch element toward said disc member and simultaneous swinging movement of said arm away from said shaft, and means connecting the other end of said main clutch shoe to said means so that upon said booster clutch shoe having executed the movement into contacting engagement with the adjacent surface of said drum between the spaced ends of said main clutch shoe said booster clutch shoe will be moved between said spaced ends of said main clutch shoe responsive to limited movement of said drum relative to said disc member and simultaneously move said main clutch shoe into contacting engagement with the adjacent portion of the inner surface of said drum, said first named means comprising a lever having one end pivotally connected to said arm intermediate the ends of the latter and having the other end pivotally connected to said booster clutch shoe, and said second named means comprising a second arm having one end pivotally connected to said disc member and having the other end pivotally connected to one end of a link member, said link member having its other end connected to said lever intermediate the ends of the latter, and link means having one end pivotally connected to said second arm intermediate the ends thereof and having the other end pivotally connected to said other end of said main clutch shoe.

References Cited in the file of this patent

UNITED STATES PATENTS

| | | |
|---|---|---|
| 1,594,105 | Miller | July 27, 1926 |
| 2,273,496 | Perry | Feb. 17, 1942 |
| 2,734,599 | Merritt | Feb. 14, 1956 |
| 2,744,597 | Merritt | May 8, 1956 |